United States Patent
Baker

(10) Patent No.: US 7,324,566 B2
(45) Date of Patent: Jan. 29, 2008

(54) METHOD AND APPARATUS FOR INTERLEAVING A DATA STREAM

(75) Inventor: Scott L. Baker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 10/625,061

(22) Filed: Jul. 22, 2003

(65) Prior Publication Data

US 2004/0008740 A1    Jan. 15, 2004

Related U.S. Application Data

(63) Continuation of application No. 09/061,017, filed on Apr. 15, 1998, now abandoned.

(51) Int. Cl.
*H04J 3/02* (2006.01)
*H04L 12/28* (2006.01)

(52) U.S. Cl. .................. 370/537; 370/355; 370/389; 709/238

(58) Field of Classification Search ........ 370/533–595, 370/476, 253, 355, 389, 390; 709/236, 238, 709/245
See application file for complete search history.

(56) References Cited

U.S. PATENT DOCUMENTS

| | | | |
|---|---|---|---|
| 3,781,818 A | 12/1973 | Pardoe et al. | |
| 5,291,485 A * | 3/1994 | Afify et al. | 370/476 |
| 5,311,519 A | 5/1994 | Getzlaff et al. | |
| 5,566,169 A | 10/1996 | Rangan et al. | |
| 5,663,910 A * | 9/1997 | Ko et al. | 365/189.05 |
| 5,825,772 A | 10/1998 | Dobbins et al. | |

FOREIGN PATENT DOCUMENTS

DE    3248566    7/1984

OTHER PUBLICATIONS

Interworking Task Group of IEEE 802.1, Draft Standard P802.1Q/D9, IEEE Standards for Local and Metropolitan Networks: Virtual Bridged Local Area Networks, IEEE Feb. 20, 1998, pp. 1-213.

* cited by examiner

*Primary Examiner*—Afsar Qureshi
(74) *Attorney, Agent, or Firm*—Grossman, Tucker, Perreault & Pfleger, PLLC

(57) ABSTRACT

Briefly, in accordance with one embodiment of the invention, a method of interleaving a data stream may occur as follows. A sequence of groupings of bits or binary digital signals from a data stream, the groupings have a predetermined size, are written from a data bus into a memory. Selective groupings stored in the memory are applied to a first multiplexer (MUX). Groupings applied to the first MUX are then applied to a second MUX. At least one grouping, applied to a third MUX, is applied to the second MUX between applying groupings from the first MUX to the second MUX.

Briefly, in accordance with another embodiment of the invention, an integrated circuit includes: a memory, a plurality of multiplexers, and a state machine. The memory, multiplexers and state machine are coupled so that selected groupings of bits from the received bit stream are capable of being extracted to produce another bit stream different from the received bit stream.

8 Claims, 1 Drawing Sheet

US 7,324,566 B2

METHOD AND APPARATUS FOR INTERLEAVING A DATA STREAM

The present patent application is a Continuation of application Ser. No. 09/061,017, filed Apr. 15, 1998 now abandoned.

BACKGROUND

1. Field

The invention is related to interleaving data streams, such as binary data streams.

2. Background Information

In some situations it is desirable to have the capability to insert or remove groupings of bits or binary digital signals, such as, for example, from a data stream. It may also be desirable in some situations to interleave two separate data streams into a single data stream. One example, although not the only example, in which it is desirable to include the capability to insert or extract groupings of binary digital signals occurs in connection with virtual local area network (VLAN) tagging of binary digital signals, such as in an ethernet compliant system. VLAN tagging is being proposed as a recent addition'to IEEE standard 802.1. See, for example, Draft Standard P802.1Q/D9, IEEE Standards for Local and Metropolitan Area Networks: Virtual Bridged Local Area Networks, available from the Institute of Electrical and Electronic Engineers, Inc. (IEEE), 345 East 47$^{th}$ Street, New York, N.Y., 10017.

SUMMARY

Briefly, in accordance with one embodiment of the invention, a method of interleaving a data stream may occur as follows. A sequence of groupings of bits or binary digital signals from a data stream, the groupings have a predetermined size, are written from a data bus into a memory. Selective groupings stored in the memory are applied to a first multiplexer (MUX). Groupings applied to the first MUX are then applied to a second MUX. At least one grouping, applied to a third MUX, is applied to the second MUX between applying groupings from the first MUX to the second MUX.

Briefly, in accordance with another embodiment of the invention, an integrated circuit includes: a memory, a plurality of multiplexers, and a state machine. The memory, multiplexers and state machine are coupled so that selected groupings of bits from the received bit stream are capable of being extracted to produce another bit stream different from the received bit stream.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
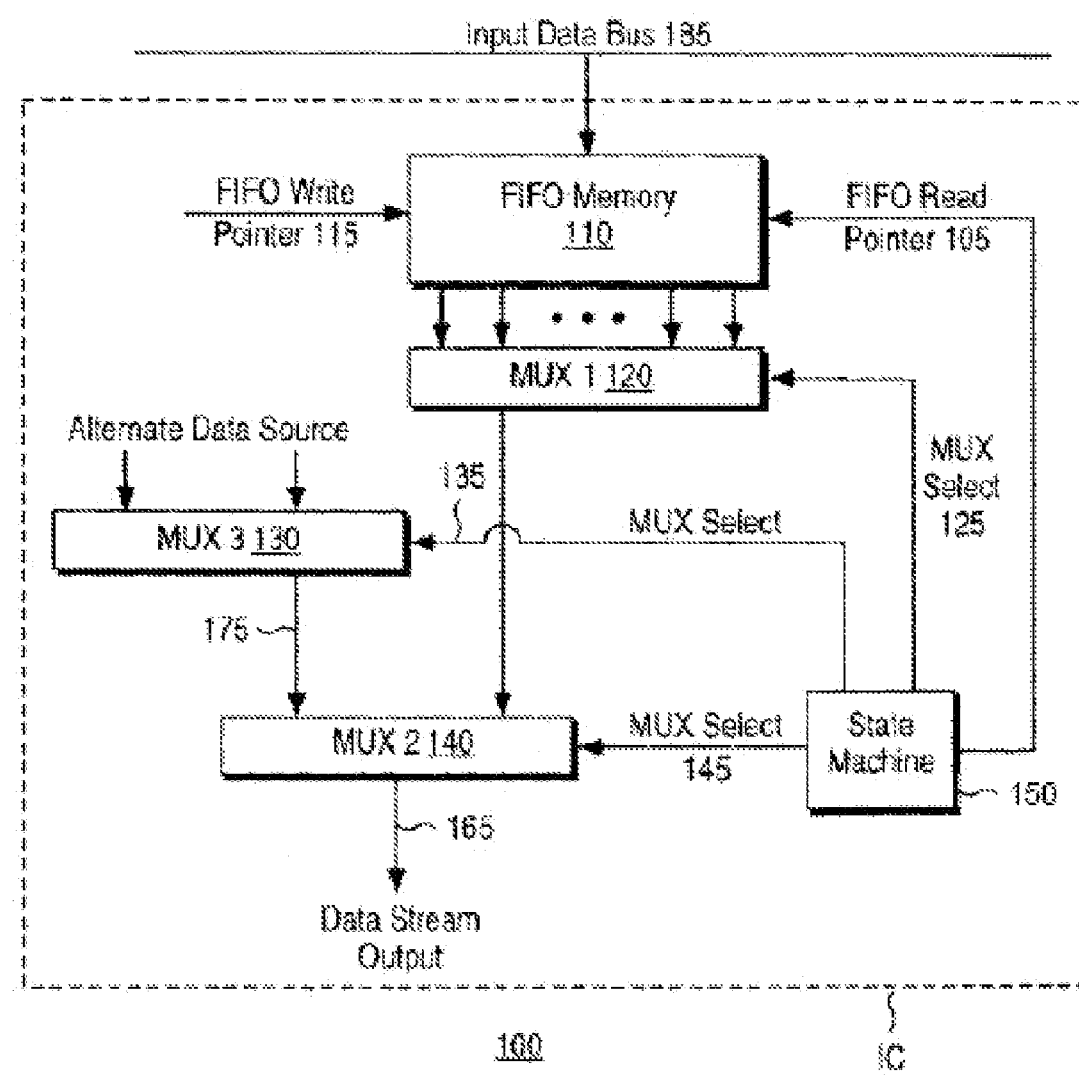
FIG. 1 is a block diagram illustrating an embodiment of a circuit for interleaving a data stream.

In the following detailed description, numerous specific details' are set forth in order to provide a thorough understanding of the invention. However, it will be understood by those skilled in the art that the present invention may be practiced without these specific details. In other instances, well-known methods, procedures, components and circuits have been described in detail so as not to obscure the present invention.

It is sometimes desirable to insert and/or remove consecutive binary digital signals, referred to in this context as groupings of bits, from a data stream. Likewise, although the invention is not limited in scope in this respect, it may be desirable to interleave two data streams to form a single data stream. In yet another example, although, again the invention is not limited in scope in this respect, it may be desirable to insert or remove a virtual local area network (VLAN) tag from a data stream, such as in the context of an ethernet switch or similar device, for example. VLAN tagging is being proposed as a recent addition to IEEE standard 802.1. VLAN tags are described, for example, in Draft Standard P802.1Q/D9, IEEE Standards for Local and Metropolitan Area Networks: Virtual Bridged Local Area Networks, available from the Institute of Electrical and Electronic Engineers, Inc. (IEEE), 345 East 47$^{th}$ Street, New York, N.Y., 10017.

FIG. 1 is a block diagram illustrating an embodiment of a circuit for interleaving a data stream in accordance with the present invention. This circuit may be embodied on an integrated circuit, although the invention is not limited in scope in this respect. Likewise, a system may include a personal computer (PC) adapted to be coupled to an ethernet compliant network, for example. Although the invention is not limited in scope in this respect, this system may include an integrated circuit including the embodiment illustrated in FIG. 1. As illustrated in FIG. 1 binary digital signals or bits traverse a data bus 185. In this particular embodiment, a sequence of groupings of bits from a data stream are received and written from data bus 185 into memory 110. In this particular embodiment, the groupings have a predetermined size, such as a byte, although the invention is not limited in scope in this respect. In this particular embodiment, although the invention is not limited in scope in this respect memory 110 comprises a first-in, first-out memory (FIFO). As illustrated in FIG. 1, FIFO memory 110 includes a FIFO read pointer. 105 and a FIFO write pointer 115. These may be employed to write received groupings of bits from the data stream into the FIFO memory and to read groupings of bits from the FIFO memory and apply them to MUX 120, as shall be explained in more detail hereinafter.

As illustrated in FIG. 1, the read and write pointers of FIFO 110 may be employed to effectively skip or extract received groupings of bits from the data stream that has been stored in the FIFO. For example, once a grouping of binary digital signals, for example, a byte, has been written to FIFO 110, read pointer 105 may skip that grouping so that it is not read from FIFO 110 and applied to MUX 120. As illustrated in FIG. 1, a state machine 150 provides the signals to FIFO read pointer 105 so that this extraction operation may be accomplished. Likewise, as illustrated, state machine 150 also provides signals to MUX ports 125, 135, 145 as well, to ensure that the operations occurring at MUXes 120, 130 and 140 are coordinated with the operation of FIFO 110 when this extraction operation is performed. It will, of course, be appreciated that a variety of digital circuits may be employed to perform the operation of state machine 150 and, therefore, the invention is not limited in scope to a particular type of circuitry or a particular state machine. As previously described, selected groupings of bits from the data stream, stored in the FIFO, are read from the FIFO or applied to MUX 120. As illustrated in FIG. 1, in this particular embodiment, this operation is performed a grouping at a time. Therefore, a grouping of binary digital signals, such as a byte, is applied to MUX 120, all the bits being applied to input ports of the MUX substantially simultaneously. One advantage of employing this approach, although the invention is not limited in scope in this respect, is that it allows the use of a slower speed FIFO while supporting a high output clock rate. More particularly, although bits may be received at a relatively high rate by a data bus 185, because groupings of bits are read from FIFO 110, more time separates read operations, permitting a relatively slower memory.

In addition to the extraction operation previously described, this particular embodiment of a circuit for interleaving a data stream includes the capability to interleave a grouping or groupings of binary digital signals. In this particular embodiment, this capability is provided via the arrangement between MUXes 120, 135 and 145, as explained in more detail hereinafter. As illustrated in FIG. 1, the output data stream is produced at output port 165 of MUX 140. Signals are applied to the input ports of MUX, 140 in this particular embodiment, from the output ports of MUXes 120 and 130, respectively. Likewise, a signal applied to MUX select port 145 of MUX 140 controls which of the input signals applied to MUX 140 appears at its output port 165.

In this particular embodiment, MUX 130 receives input signals from an alternative data source. This data source or data stream is to be interleaved with the data stream written to FIFO 110, as previously described. Therefore, a signal applied to MUX select port 135 of MUX 130 controls the application of signals from this alternative data source or data stream to MUX 140. Likewise, selective groupings stored in FIFO 110 may be applied to the input port of 140 via MUX 120 by the application of a control signal to MUX select port 125 of MUX 120. Therefore, as previously illustrated, in this particular embodiment, controlling the signals applied MUX select ports 125, 135 and 145 of MUXes 120, 130 and 140 may result in the interleaving of the data stream written to FIFO 110 and the data stream applied to MUX 130. Although the invention is not limited in scope in this respect, the alternative data stream or data source applied to MUX 130 may comprise bits of binary digital signals representing a VLAN tag, for example. Therefore, this tag may be interleaved with the data signals with FIFO 110, as a data stream is produced by output port 165.

In one embodiment, although the invention is not limited in scope in this respect, binary digital signals may be received via data bus 185 and written to FIFO 110 in bursts of data signals. For example, although the invention is not limited in scope in this respect, a dynamic random access memory (DRAM) may be coupled to data bus 185 and provide these bursts of bits or binary digital signals.

An embodiment of a method of interleaving a data stream in accordance with the invention may be accomplished as follows. A sequence of groupings of bits from a data stream may be written from a data bus into memory. For example, as illustrated in FIG. 1, with data bus 185 and memory 110. The groupings in this embodiment have a predetermined size. Selected groupings that are stored in the memory, may be read from it and applied to a first multiplexer (MUX). Again, this is illustrated in FIG. 1 by MUX 120. The groupings applied to the first MUX are then applied to the second MUX, in this embodiment, by the first MUX. However, at least one grouping is applied to the second MUX between applying the groupings from the first MUX to the second MUX.

If FIG. 1, this is accomplished with MUXes 140 and 130. If the at least one grouping is from a data stream, then this embodiment provides a method of interleaving the data streams for the embodiment illustrated in FIG. 1, the memory comprises a first-in, first-out memory (FIFO). Likewise, the sequence of groupings of bits are received consecutively, via a data bus in this embodiment, as previously indicated, and written into memory. The grouping size may comprise a byte in one embodiment. One of the groupings may comprise a virtual local area network (VLAN) tag. Also, the data signals may be provided in bursts, such as from a burst node dynamic modem access memory (DRAM), for example. Of course, the invention is not limited in scope to the features of this particular embodiment.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

The invention claimed is:

1. A method comprising:
consecutively receiving at and writing into a memory a sequence of groupings of bits from a data stream, the groupings of bits having a predetermined size;
reading from the memory a subset of the sequence of the groupings of bits written into the memory, the subset having fewer groupings of bits than the sequence of groupings of bits written into the memory;
applying the subset to a first multiplexer (MUX);
applying another data stream to a third MUX, the another data stream comprising bits representing a virtual local area network (VLAN) tag; and
selectively applying to a second MUX the subset applied to the first MUX and the another data stream applied to the third MUX.

2. The method of claim 1, wherein:
the memory comprises a first in, first out (FIFO) memory; and
the reading is based upon a read pointer generated by a state machine.

3. The method of claim 2, wherein:
the state machine also generates a first MUX select signal, a second MUX select signal, and a third MUX select signal applied to the first MUX, the second MUX, and the third MUX, respectively.

4. An apparatus comprising:
a memory capable of consecutively receiving and storing a sequence of groupings of bits from a data stream, the groupings of bits having a predetermined size, the memory also being capable of retrieving a subset of the sequence of the groupings of bits written into the memory, the subset having fewer groupings of bits than the sequence of groupings of bits written into the memory; and
a first multiplexer (MUX), a second MUX, and a third MUX;
the apparatus being capable of applying the subset to the first MUX, applying another data stream to the third MUX, and selectively applying to a second MUX the subset applied to the first MUX and another data stream applied to the third MUX, the another data stream comprising bits representing a virtual local area network (VLAN) tag.

5. The apparatus of claim 4, wherein:
the memory comprises a first in, first out (FIFO) memory; and the apparatus also comprises a state machine to generate a read pointer, the memory being capable of retrieving the subset based upon the read pointer.

6. The apparatus of claim 5, wherein:
the state machine is also capable of generating a first MUX select signal, a second MUX select signal, and a third MUX select signal to be applied to the first MUX, the second MUX, and the third MUX, respectively.

7. A system comprising:
an integrated circuit comprising:
  a memory capable of consecutively receiving and storing a sequence of groupings of bits from a data stream, the groupings of bits having a predetermined size, the memory also being capable of retrieving a subset of the sequence of the groupings of bits written into the memory, the subset having fewer groupings of bits than the sequence of groupings of bits written into the memory; and
  a first multiplexer (MUX), a second MUX, and a third MUX;
  the integrated circuit being capable of applying the subset to the first MUX, applying another data stream to the third MUX, and selectively applying to the second MUX the subset applied to the first MUX and another data stream applied to the third MUX, the another data stream comprising bits representing a virtual local area network (VLAN) tag.

8. The system of claim 7, further comprising:
an input data bus coupled to the memory.

* * * * *